United States Patent [19]
Rigney et al.

[11] Patent Number: 6,042,880
[45] Date of Patent: Mar. 28, 2000

[54] RENEWING A THERMAL BARRIER COATING SYSTEM

[75] Inventors: Joseph D. Rigney, Milford; Jeffrey A. Conner; David J. Wortman, both of Hamilton; Bangalore A. Nagaraj, West Chester, all of Ohio

[73] Assignee: General Electric Company, Cincinnati, Ohio

[21] Appl. No.: 09/219,163

[22] Filed: Dec. 22, 1998

[51] Int. Cl.[7] ................................................. B32B 35/00
[52] U.S. Cl. ........................... 427/142; 427/454; 29/889.1
[58] Field of Search ................................. 427/142, 454; 29/889.1

[56] References Cited

U.S. PATENT DOCUMENTS

| | | | |
|---|---|---|---|
| 3,544,348 | 12/1970 | Boone et al. | 117/2 |
| 4,055,705 | 10/1977 | Stecura et al. | 423/63 |
| 4,095,003 | 6/1978 | Weatherly et al. | 427/34 |
| 4,328,285 | 5/1982 | Siemers et al. | 428/633 |
| 5,167,721 | 12/1992 | McComas et al. | 134/32 |
| 5,216,808 | 6/1993 | Martus et al. | 29/889.1 |
| 5,236,745 | 8/1993 | Gupta et al. | 427/454 |
| 5,254,413 | 10/1993 | Maricocchi | 428/633 |
| 5,658,614 | 8/1997 | Basta et al. | 427/253 |
| 5,813,118 | 9/1998 | Roedl et al. | 29/889.1 |
| 5,846,605 | 12/1998 | Rickerby et al. | 427/255 |
| 5,972,424 | 10/1999 | Draghi et al. | 427/142 |

*Primary Examiner*—Katherine A. Bareford
*Attorney, Agent, or Firm*—Andrew C. Hess; Gerry S. Gressel

[57] ABSTRACT

A thermal barrier coating (TBC) system, comprising a metallic bond coat on an article surface and an outer ceramic TBC is repaired by renewing without removing the bond coat. The outer ceramic TBC is removed to expose a bond coat substrate. At least one discrete local surface area of the article surface subject to bond coat degradation is selected from a thermal pattern unique to the article surface from service operation. At least one renewal metal selected from Pt, Rh, and Pd is applied at least to the selected discrete local surface area and heated to diffuse the renewal metal into the bond coat substrate. An environmental resistant coating selected from aluminides and alloys including aluminum is applied at least to the discrete local surface area over the renewal metal. Thereafter, an outer ceramic TBC is applied to the article surface.

6 Claims, 3 Drawing Sheets

RENEWING A THERMAL BARRIER COATING SYSTEM

BACKGROUND OF THE INVENTION

This invention relates to renewal of a protective coating on an article, and, more particularly, to renewing a thermal barrier coating (TBC) system by renewing a bond coat beneath the TBC.

Certain components or articles operating in the gas path environment of a gas turbine engine are subjected to significant temperature extremes and degradation by oxidizing and corrosive conditions. It is common practice in the gas turbine engine art to apply a thermal barrier coating (TBC) system to surfaces of such components to protect them from such environment, while also affording the opportunity to improve the efficiency of the engine by enabling increase in operating temperatures.

TBC systems generally are comprised of a metallic environmental inner coating, generally and herein called a bond coat, applied to an article surface, and an insulating ceramic outer layer, generally applied directly over the bond coat. Typical of such TBC outer coatings is one based on zirconia stabilized with yttria, for example about 92 wt. % zirconia stabilized with about 8 wt. % yttria. One preferred method for application or deposition of a TBC coating is by electron beam physical vapor deposition although plasma spray processes are widely used for turbine engine combustor applications. Apparatus is sold commercially for such uses. This general type of TBC system has been reported for some time as evidenced by such U.S. Patents as U.S. Pat. No. 4,055,705—Stecura et al. (patented Oct. 25, 1977); U.S. Pat. No. 4,095,003—Weatherly et al. (patented Jun. 13, 1978); U.S. Pat. No. 4,328,285—Siemers et al. (patented May 4, 1982); U.S. Pat. No. 5,216,808—Martus et al. (patented Jun. 8, 1993) and U.S. Pat. No. 5,236,745—Gupta et al. (patented Aug. 17, 1993).

Most frequently used bond coats for gas turbine engine turbine airfoils and combustor components have been classified into two general types. One is an overlay M Al type in which M is at least one element selected from Fe, Ni, and Co, for example MAl, MAlY, MCrAl, and MCrAlY; the other is diffused aluminide coatings. Both of these types have been widely used and reported in connection with the gas turbine art. MCrAlY type coating has been applied by physical vapor deposition, including sputtering, cathodic arc, and electron beam, as well as by plasma spray processes. Coating composition, microstructure and thickness are controlled by processing parameters. Diffused aluminide coatings have been applied by a variety of methods including, as used in the art, pack cementation, above the pack, vapor phase, chemical vapor deposition and slurry coating processes. The thickness and aluminum content of the end product coating has been controlled by varying coating time, coating temperature and aluminum activity of the coating materials and process. The performance of such coatings often is enhanced by incorporating such elements as Pt, Rh, Pd, Cr, Si, Hf, Zr, and/or Y. With either type of bond coat, elements of the bond coat interdiffuse with an article substrate during processing or operation or both yielding a diffusion zone between the bond coat and the underlying article substrate. The diffusion zone is considered to be part of the bond coat and, hence, the TBC system. As used herein, the term bond coat substrate is intended to mean at least a portion of the remaining bond coat and such diffusion zone between the bond coat and the underlying article substrate.

For gas turbine engine applications, the materials and processing methods chosen for the TBC system are selected to provide resistance to spallation of the ceramic outer layer during thermal cycling of the engine as well as resistance to the oxidizing and corrosive environment in the case of a TBC spallation event. During normal engine operation after time, the TBC system, including the bond coat and the ceramic outer layer, will degrade in certain surface areas most subject to strenuous operating conditions. The bond coat has been observed to interdiffuse with an article substrate in such surface areas during operation to the extent that its protective ability has been reduced below an acceptable level, necessitating the removal and reapplication of a protective coating. A current practice in such repair is to remove the entire TBC system including the bond coat, along with its zone of diffusion with the article substrate, and the outer ceramic layer. After any required repair of the article structure, the entire TBC system, including a new bond coat and a new outer ceramic coating, is reapplied. However, that type of TBC system removal, in which the bond coat diffusion zone is removed, will lead to thinning of article walls. Numerous mechanical property data bases have been reported that show a strong correlation of key mechanical properties (including creep rupture strength and high cycle fatigue capability) and remaining wall thickness. Therefore, such wall thinning can result in reduction in operating life and subsequent repairability of the article, as well as airflow control problems if air cooling openings are involved.

BRIEF SUMMARY OF THE INVENTION

The present invention, in one form, provides a method of renewing a TBC system on an article surface without removing the entire metallic bond coat. The method comprises removing the outer ceramic TBC to expose a bond coat substrate, including any original bond coat and the bond coat diffusion zone. From a thermal pattern unique to the article surface from service operation there is selected at least one discrete local surface area of the article surface subject to bond coat degradation during service operation. At least one renewal metal selected from Pt, Rh, and Pd is applied to the bond coat substrate at least at the discrete local surface area; and the renewal metal is heated at a temperature and for a time sufficient to diffuse the renewal metal into the bond coat substrate. An environmental resistant coating selected from aluminides and alloys including aluminum then is applied to at least the discrete local surface area over the diffused renewal metal. Thereafter, an outer ceramic TBC is applied to the article surface.

DETAILED DESCRIPTION OF THE INVENTION

Figure 1:
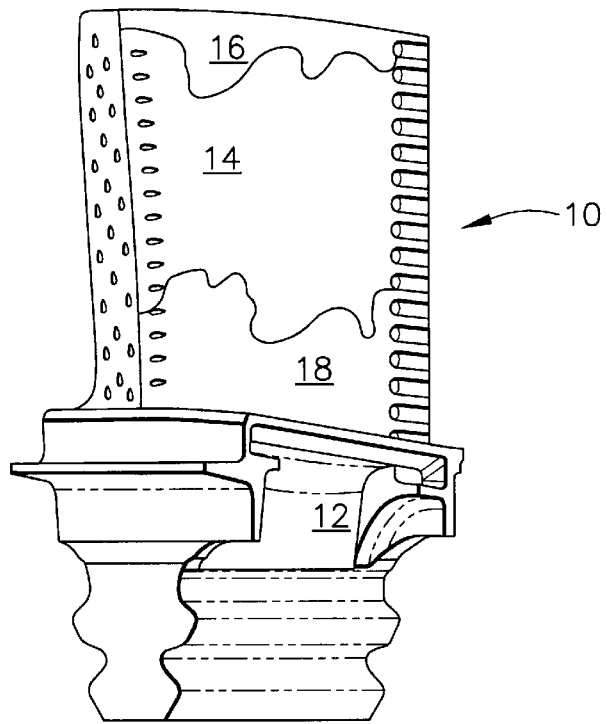
FIG. 1 is a perspective, diagrammatic view of a gas turbine engine blade from the concave side showing discrete, local surface areas subject to coating degradation in a thermal pattern unique to the article from service operation.

During service operation of a gas turbine engine, a hot operating article or component such as a combustor, an airfoil of a turbine blade or vane, etc., is known to experience and exhibit a thermal pattern non-uniform across its surface and unique to the design of the particular component and engine. One typical unique thermal pattern on the concave side of a gas turbine blade airfoil is shown in the perspective, diagrammatic view of FIG. 1. In FIG. 1, a gas turbine engine high pressure turbine blade shown from the airfoil concave side generally at 10 comprises a base 12 and an airfoil 14 which includes thereon a protective TBC system. Shown on the article surface of the concave side of the airfoil 14 are discrete local surface areas represented by 16 and 18 which are subject to more strenuous thermal conditions during service operation of the blade in an engine. In some unique patterns, such areas as 16 and 18 merge along the leading edge of the airfoil. This type of thermal pattern results in non-uniform degradation at such article surface, including non-uniform diffusion of a surface coating such as a bond coat into the article substrate, and/or oxidation of an exposed bond coat. In the above described type of TBC system, the article surface areas, for example on an airfoil surface, subjected to the highest temperatures experience greater diffusion loss of critical bond coat elements into the substrate, and the potential for TBC spallation and subsequent exposure of bond coat to the oxidizing and corrosive atmosphere. Cooler locations on the surface of components with such a TBC system may virtually be unaffected by engine operation.

Figure 2:
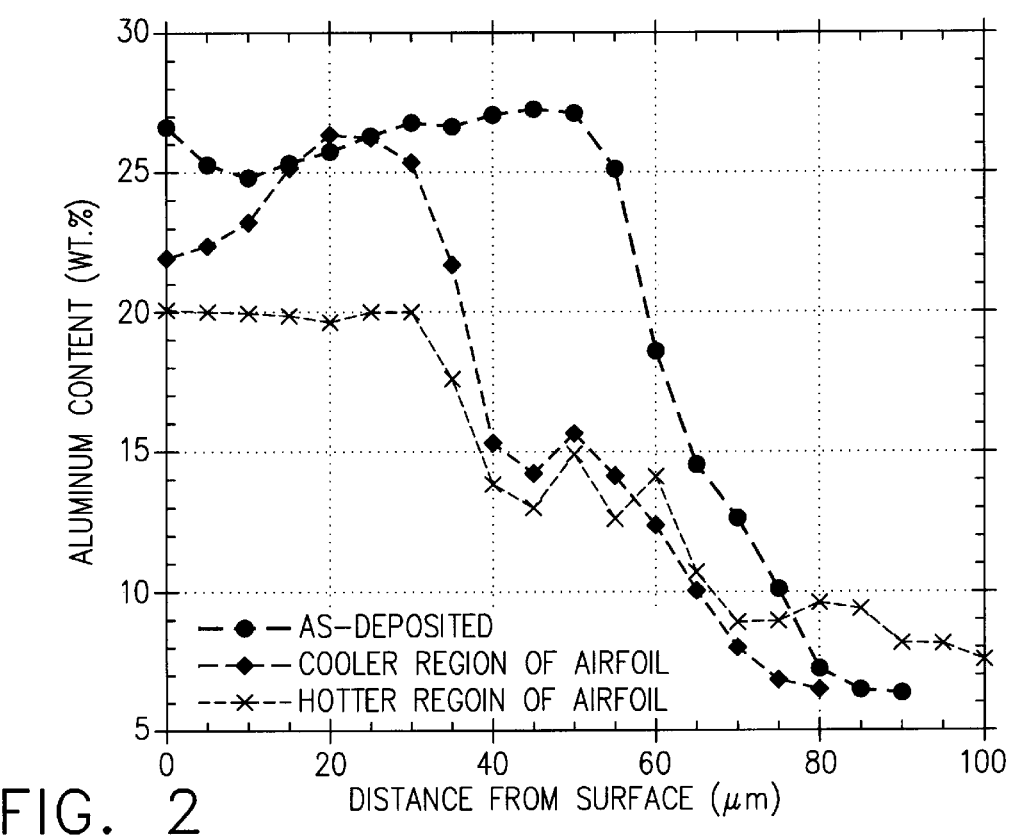
FIG. 2 is a graphical comparison of change in aluminum content of a bond coat at various turbine blade locations as a result of service operation.
Figure 3:
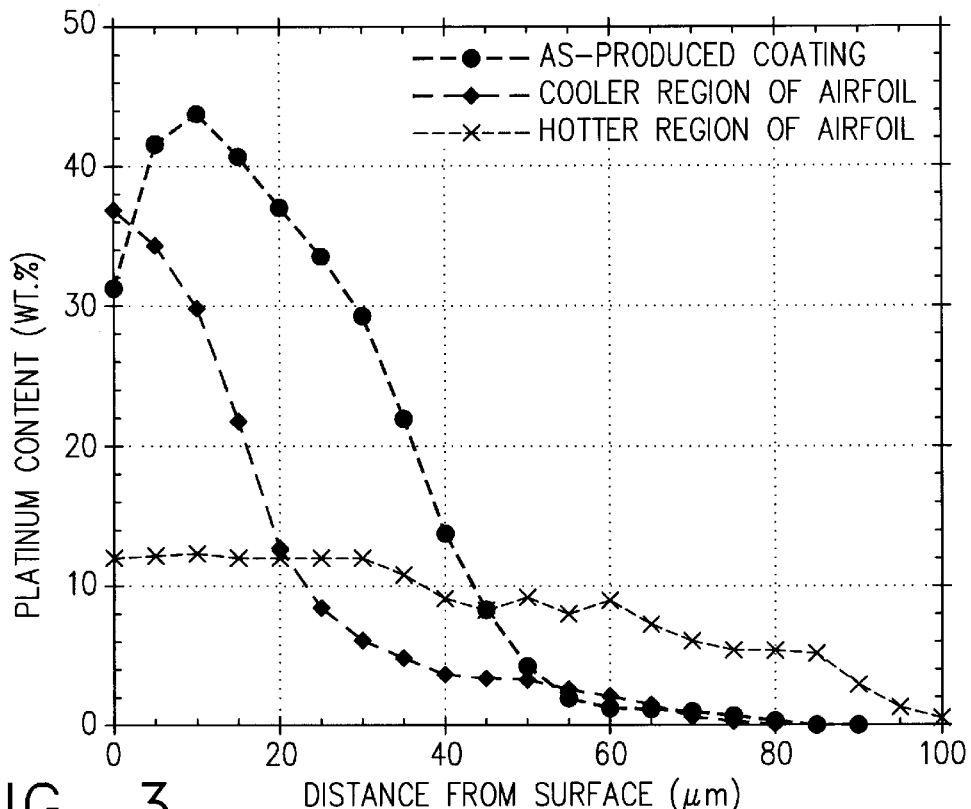
FIG. 3 is a graphical comparison of change in platinum content of a bond coat at various turbine blade locations as a result of service operation.
Figure 4:
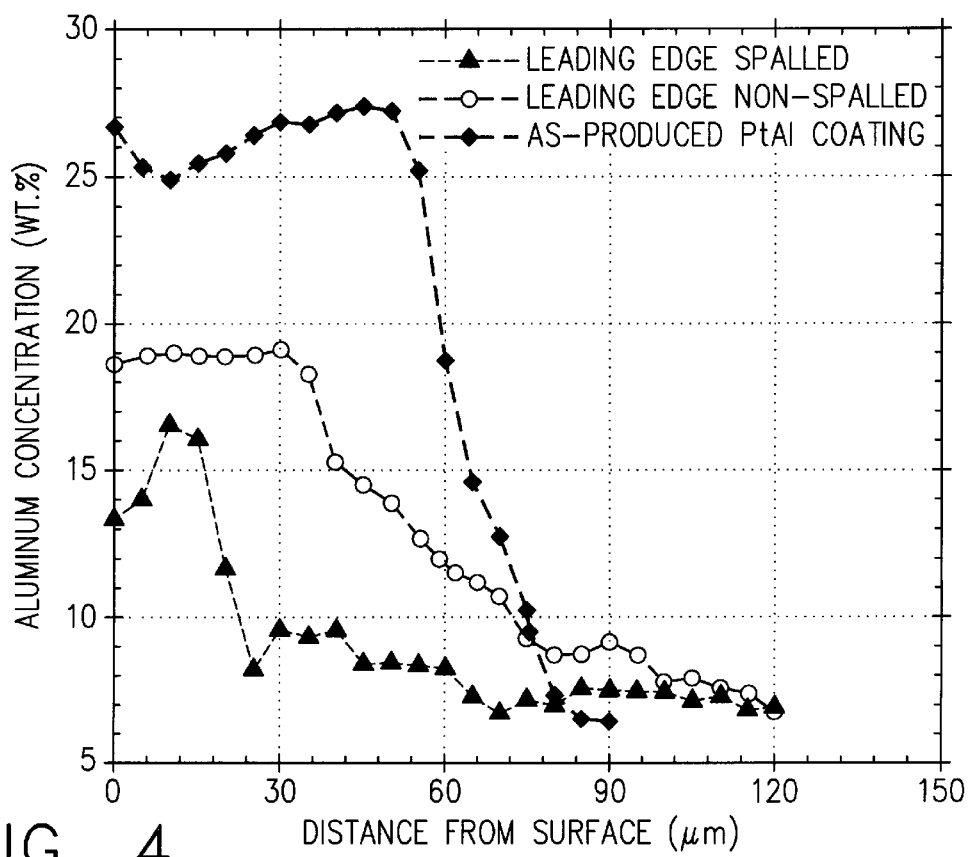
FIG. 4 is a graphical comparison of differences in depletion of PtAl in a bond coat as a function of spallation of an outer ceramic TBC.

The graphical comparisons of FIGS. 2 and 3 show, respectively, aluminum and platinum depletion from a bond coat including those elements, at different locations on a turbine blade airfoil surface. Such depletion in the form of diffusion of elements toward the article substrate as a function of thermal exposure occurred beneath an outer ceramic TBC, in the absence of spallation of the TBC. The graphical comparison of FIG. 4 shows the effect of spallation, and the resulting direct exposure of the bond coat to an oxidizing atmosphere, on the amount of depletion of aluminum from a bond coat including PtAl at the leading edge of a turbine blade airfoil. Therefore, it was recognized in connection with the present invention that the above described potentially detrimental, as well as costly, removal of the entire bond coat including its diffusion zone into the article substrate was unnecessary. According to the present invention, only selected surface areas in a thermal pattern unique to the component and most affected by such exposure require renewal in a TBC system.

An initial step in the practice of the present invention is the removal from the article surface, such as the surface of an airfoil, of the outer ceramic TBC substantially without affecting the underlying bond coat substrate. One preferred removal method used in the evaluation of the present invention included directing a stream of water under pressure, for example in the range of about 5–20 ksi, at a pretreated outer ceramic TBC layer. This removed the TBC without damaging or removing the bond coat substrate, as defined above. In general, methods for accomplishing such removal, reported extensively in the current art, include the controlled pressure application of abrasives, grit, vapors, liquids, etc. Such removal exposes the bond coat substrate which can include any remaining original bond coat as well as the diffusion zone in which the bond coat has diffused into the article substrate.

After removal of the outer ceramic TBC, at least one discrete local surface area of the article surface subject to bond coat degradation was selected from a thermal pattern unique to the article surface and observed from service operation. Examples of such discrete local areas are airfoil areas 16 and 18 in FIG. 1; another type of thermal pattern includes a joined combination of areas 16 and 18 merged along the airfoil's leading edge. A renewal metal selected from Pt, Rh, Pd, or their combinations was applied at least to the exposed bond coat substrate at the selected discrete local area. When only the discrete areas were to be coated, the balance of the surface was masked, for example using standard electroplater's tape. Other commonly used masking materials include non-conductive, for example plastic, clip-on tooling. Then the renewal metal was applied, in one example by electrodeposition. The thickness of the applied renewal metal was varied based on the degree of interdiffusion of the bond coat with the article substrate at the selected discrete areas (for example as shown in FIGS. 2, 3, and 4), the overall coating scheme planned for the article, and consideration of unique specific operational constraints for the article.

Following its application, the renewal metal, and conveniently the entire article to which the renewal metal was applied, was heated in a non-oxidizing atmosphere to a temperature, typically in the range of about 900–1150° C., and held for a time, typically about 0.5–4 hours, sufficient to diffuse the renewal metal into the underlying bond coat substrate. In one example in which Pt was the renewal metal applied to a thickness of about 6 microns, the temperature was about 1050° C. and the time was about 2 hours to diffuse the renewal metal into the bond coat substrate. This separate diffusion heat treatment eliminates the need, in other current practice, for extended high temperature exposure during an aluminiding cycle sometimes used to accomplish both deposition of aluminum and diffusion of an applied metal such as Pt into the underlying coating or substrate. Also through the present invention, it allows significant flexibility in the selection of the type of process and process parameters for a subsequently applied environmental protective coating, for example an aluminide.

Figure 5:
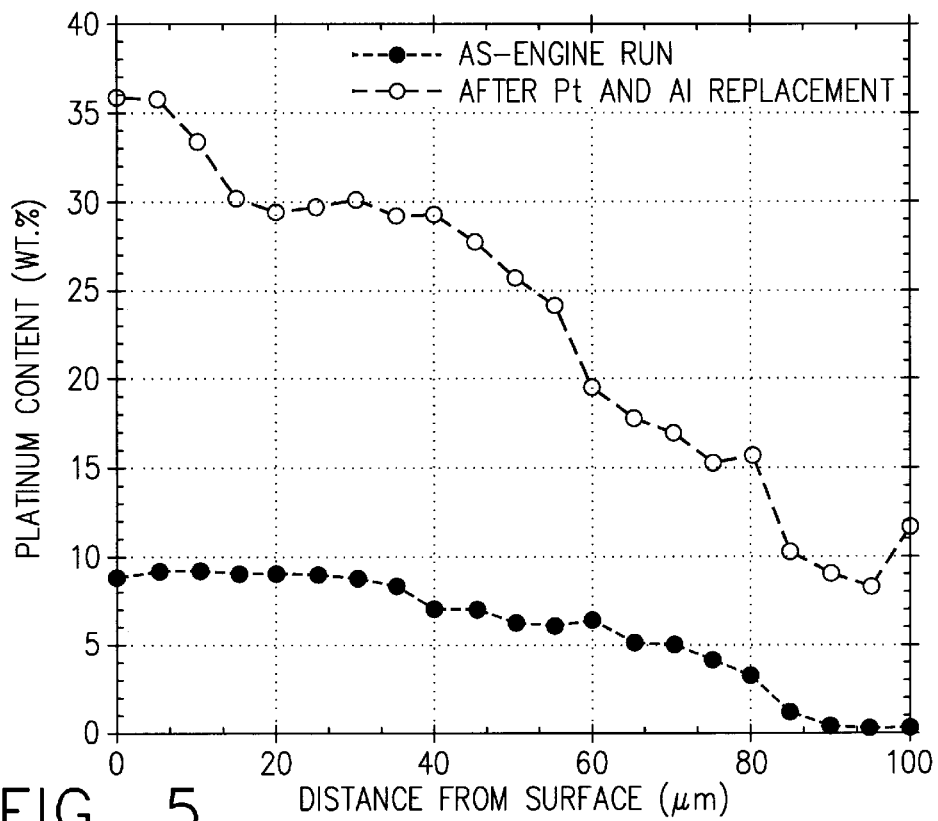
FIG. 5 is a graphical comparison of platinum content at the bond coat before and after bond coat renewal.
Figure 6:
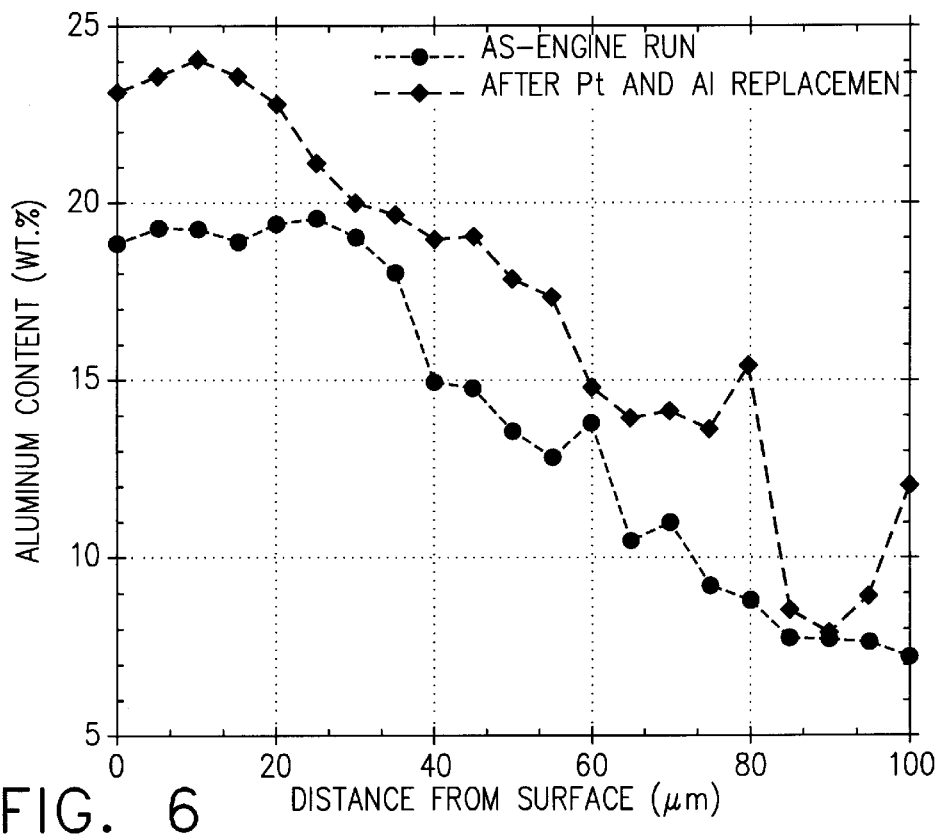
FIG. 6 is a graphical comparison of aluminum content at the bond coat before and after bond coat renewal.

Subsequent to application and diffusion of the renewal metal, an environmental resistant coating, for example an aluminide or an alloy including aluminum, was applied at least to the discrete surface areas over the diffused renewal metal, and preferably to the entire article surface area, such as the entire airfoil of a blade, including surface areas to which a renewal metal was not applied in the steps above. In one example in which the entire airfoil surface was coated with an aluminide environmental coating, coating parameters were selected such that a Pt renewal metal modified aluminide coating, for example a PtAl coating, was produced at the selected discrete local surface areas, while adjacent surface areas not treated with the renewal metal were enriched with aluminum without appreciable thickness change. Resulting from this practice was a renewed bond coating of restored protective capability at the selected discrete local areas. In addition, adjacent surface areas were provided with improved environmental capacity. The graphical comparison of FIG. 5 shows an example of the platinum profile of treated, selected discrete local areas of a turbine blade airfoil after service operation and after replacement of Pt and Al. The graphical comparison of FIG. 6 shows an example of the aluminum profile of the turbine blade airfoil after service operation and after aluminiding of the entire airfoil surface, as described above. The capability in both instances were renewed to levels close to the as-produced coating levels.

In one embodiment, the renewal metal can be Pt, and the environmental resistant coating can be one of an MAl type alloy, in which M is at least one metal selected from the group consisting of Fe, Co, and Ni. The environmental resistant coating can be applied to the entire article surface. The MAl type alloy can be an MCrAlY type alloy.

After renewal of the bond coat as described above, a new ceramic outer TBC was applied over the bond coat using electron beam physical vapor deposition, according to current commercial practice in the art. Practice of the present invention restored the TBC system without negative effects on the article, for example wall thickness reduction as discussed above, or unnecessary removal of bond coat substrate. In addition, bond coat areas adjacent to the selected discrete areas treated with the renewal metal were enhanced without substantial increase in thickness.

The present invention provides an efficient, effective method for repairing a TBC system by renewing selected discrete surface areas of an underlying bond coat without removal of a bond coat substrate. In one form, it enhances the environmental capability of surface areas adjacent to the selected areas. Although the invention has been described in connection with specific examples and embodiments, they are intended to be typical of rather than in any way limiting on the scope of the present invention. Those skilled in the arts involved will understand that the invention is capable of variations and modifications without departing from the scope of the appended claims.

We claim:

1. A method for renewing a thermal barrier coating (TBC) system on an article surface, the TBC system comprising a metallic bond coat on the article surface and an outer ceramic TBC, comprising the steps of:

removing the outer ceramic TBC to expose a bond coat substrate;

selecting from a thermal pattern, unique to the article surface from service operation, at least one discrete local surface area of the article surface subject to bond coat degradation during service operation;

applying to the exposed bond coat substrate at least at the discrete local surface area at least one renewal metal selected from the group consisting of Pt, Rh, and Pd;

heating the renewal metal at a temperature and for a time sufficient to diffuse the renewal metal into the bond coat substrate;

applying an environmental resistant coating selected from the group consisting of aluminides and alloys including aluminum to at least the discrete local surface area over the renewal metal; and then, applying an outer ceramic TBC to the article surface.

2. The method of claim 1 in which the environmental resistant coating is applied to the entire article surface.

3. The method of claim 1 in which the renewal metal is heated at a temperature in the range of about 900–1150° C. for a time in the range of about 0.5–4 hours.

4. The method of claim 3 in which:

the renewal metal is Pt;

the environmental resistant coating is an aluminide; and, the environmental resistant coating is applied to the entire article surface.

5. The method of claim 3 in which:

the renewal metal is Pt;

the environmental resistant coating is an MAl type alloy in which M is at least one metal selected from the group consisting of Fe, Co, and Ni; and, the environmental resistant coating is applied to the entire article surface.

6. The method of claim 5 in which the MAl type alloy is an MCrAlY alloy.

* * * * *